United States Patent [19]
Stremple

[11] Patent Number: 5,828,494
[45] Date of Patent: Oct. 27, 1998

[54] GLASS PANEL UNIT FOR REFRACTING AND DISPERSING LIGHT

[76] Inventor: Paul R. Stremple, 160 Monks Rd., Saxonburg, Pa. 16056

[21] Appl. No.: 772,304

[22] Filed: Dec. 23, 1996

Related U.S. Application Data

[63] Continuation of Ser. No. 245,716, May 18, 1994, abandoned.

[51] Int. Cl.$^6$ .............................. G02B 5/04; G02B 27/00
[52] U.S. Cl. .......................... 359/615; 359/837; 359/591; 359/592; 362/1; 362/2; 362/330; 362/339
[58] Field of Search .................................... 359/591, 592, 359/593, 594, 599, 601, 613, 615, 831, 837; 362/1, 2, 330, 331, 332, 333, 339

[56] References Cited

U.S. PATENT DOCUMENTS

| 595,264 | 12/1897 | Ewen | 359/594 |
|---|---|---|---|
| 1,669,663 | 5/1928 | Hobbie | 359/592 |
| 2,248,638 | 7/1941 | Merton | 359/592 |
| 2,381,542 | 8/1945 | Hyatt et al. | 359/614 |
| 3,166,973 | 1/1965 | Healey | 353/121 |
| 3,393,034 | 7/1968 | Imai | 359/613 |
| 3,438,699 | 4/1969 | Seeger | 359/613 |
| 3,755,664 | 8/1973 | Reiback | 40/433 |
| 4,307,528 | 12/1981 | Dewees | 40/433 |
| 4,742,439 | 5/1988 | Choate | 362/311 |
| 4,805,990 | 2/1989 | Edwards | 359/615 |
| 4,832,453 | 5/1989 | Saad-Cook | 359/896 |
| 4,849,866 | 7/1989 | Mori | 362/327 |
| 5,247,491 | 9/1993 | Kwiatkowski | 368/79 |

*Primary Examiner*—Ricky D. Shafer
*Attorney, Agent, or Firm*—Diane R. Meyers; Arnold B. Silverman; Eckert Seamans Cherin & Mellott, LLC

[57] ABSTRACT

A panel unit for use in a window, a partition, a free standing frame, or in a wall, and having a plurality of vertically stacked, elongated transparent elements arranged in a frame, whereby natural light or artificial light on one side of the panel reflects onto the environment on the one side of the panel unit. The reflected light is transmitted through each transparent element and is refracted and dispersed to create a block of color when viewed on the other side of the panel, which results in a color pattern when viewed on the other side of the panel unit. The transparent elements may be made of lead crystal glass or optical glass, and may be triangularly shaped to produce a maximum light dispersion zone or trapezoidally shaped to produce a minimum light dispersion zone. To resist or reduce glare, a shutter apparatus may be mounted adjacent to the panel unit on the side of the panel unit where the direct sunlight exists, or filters or tinted glass may be used.

20 Claims, 8 Drawing Sheets

GLASS PANEL UNIT FOR REFRACTING AND DISPERSING LIGHT

This application is a continuation of application Ser. No. 08/245,716, filed May 18, 1994, now abandoned.

BACKGROUND OF THE INVENTION

1. Field of the Invention

The present invention relates to a glass panel unit which may be used in a window, a free standing frame, a wall, or a partition in a lobby which with the light and the surroundings creates a pattern of color which is aesthetically pleasing or restful to a viewer.

2. Background Information

In modern residential and commercial building structures, an architect may provide a restful place in a foyer or in a lobby which may include trees and plants, and/or exterior glass walls which contain block glass or clear glass in which the outside environment can be seen or etched glass, or interior partitions which may contain block, clear, or etched glass panels. Additionally, some windows may contain stained glass producing a colored picture or a mosaic. The glass block generally distorts the transmitted images, and may refract light, but does not disperse light. Stained glass transmits illuminated pigment through the use of colored or painted glass. It merely shows light passing through colored pictures of glass for a collage effect. The color patterns are permanent and do not vary, and reflection or dispersion of the light does not occur. Etched glass may contain an artistic design, which is not necessarily colorful, and light is generally not refracted or dispersed.

The prior art also includes several devices which may use the sunlight or artificial light in combination with pieces of material which refract or reflect light to project or produce colored patterns. This prior art includes U.S. Pat. Nos. 3,166,973; 3,755,664; 4,307,528; 4,742,439; 4,832,543; 4,849,866; and 5,247,491.

In particular, U.S. Pat. No. 4,832,453 discloses sunlight as passing through a window and reflecting from a spectral display device to produce a rainbowlike projection on a wall or other planar surface. The reflecting surface may be arranged to project a particular color depending upon the angle at which the sunlight strikes the reflecting surface and to change those colors as the angle of the sun changes. U.S. Pat. No. 4,849,866 discloses prism members which project colored light and which refract parallel light rays to create a rainbow effect, which can be radiated onto trees, fountains, or the like to create a pleasant viewing spectacle.

These devices of the prior art are generally complicated and costly; need either direct sunlight or artificial light and cannot alternatively use one or the other; or may involve light projection only onto an object or planar surface.

The present invention may generally replace the glass block, the stained glass, or etched glass windows and/or room partitions which have been in use for a number of years as a work of art.

SUMMARY OF THE INVENTION

The present invention provides a glass panel unit having several transparent light reflection and dispersion elements, which may be considered as being a work of art, and which includes, but is not limited to, windows, room partitions, free standing frames, or part of a wall. The transparent elements which reflect and disperse light may be optical glass or lead crystal glass with a high index of refraction, ranging from about 1.45 to about 1.70 depending on whether the glass is optical or lead crystal. When the glass panel unit of the invention is used in a window system, the sun moves and its light impinges onto the outside of the glass panel unit with each transparent element shaped to produce a certain block of color when viewed from the other side of the glass panel unit. Each transparent element is preferably shaped to allow a specific color to pass through the element. For instance, a block of green color, a band of blue color, and a band or block of red color may pass through the element. The overall effect when viewed from the other side is a vivid color pattern with blocks or bands of color overlapping to form a mosaic color pattern which is controlled by the shape of the transparent elements. During the course of the day, as the angle of incidence of the sunlight on the glass panel unit changes, the viewed color pattern may also change. A shutter with generally narrow spaced apart, horizontally arranged strip members can be positioned outside the window to reduce glare, or filters can be used to reduce glare. The transparent elements can be shaped to be angled to create a minimum or a maximum light dispersion zone.

When the glass panel unit of the present invention is used in a room divider or partition, a barrier with reflecting surfaces is provided. This barrier is spaced away from the partition, and a fixed source of artificial light is angled to direct its rays onto the reflecting surfaces of the barrier. The resultant reflecting light waves bounce onto the surrounding environment between the partition and the barrier and each transparent element transmits at least one color through each element, thereby creating several blocks or bands of color so as to create a mosaic pattern when viewed on the side of the partition opposite to that of the barrier.

Embodiments of the present invention provide for the transparent elements being triangularly shaped or trapezoidally shaped to provide either a maximum color dispersion zone or a minimum color dispersion zone, respectively, and each element as being arranged in a stack or side-by-side generally co-planar to create a layered pattern of varying colors when viewed on a side of the window or partition opposite to the side where the light is reflected off of the environment.

It is an object of the present invention to enhance the atmosphere of selected areas of a building structure to create an aesthetically pleasing and an artistic effect by utilizing either natural or artificial light and the colors from the surrounding environment.

It is a further object of the present invention to provide a glass panel unit which may be considered as a work of art.

It is a still further object of the invention to provide a glass panel unit which contains several light reflecting and light dispersing elements, each of which provide a block or band of color, and which blocks or bands of color overlap to create a mosaic color pattern.

A still further object of the invention is to provide a glass panel unit with several light reflecting and dispersing elements which are shaped to produce and control a color pattern.

And yet a further object of the present invention is to provide a glass panel unit, one or more of which may be used in a window, a room divider, a partition, a wall system, a free standing frame, or a pedestal.

These and other features and advantages of the present invention will be better appreciated and understood from the following detailed description along with the accompanying drawings:

DESCRIPTION OF THE PREFERRED EMBODIMENTS

Refraction may be defined as a general bending of light waves, such as light in a lens in field glasses or light in a minor. Dispersion may also be considered as being a refraction of light, but also involves the separation of light into wave components. A viewing area or zone may be defined as that area which allows viewing of color and a color pattern without glare. The viewing zone is between about a 45° to about a 85° angle relative to a vertical plane in which the panel unit of the present invention lies. If a viewer is beyond, say for example, 40 feet from the panel unit, or is only 2 feet away from the panel unit, he or she may move out of the viewing zone and may not see any color pattern and only see the elements of the panel unit.

A minimum dispersion zone is defined as a viewing zone having relatively thin bands of color. A maximum dispersion zone is a viewing area where the maximum amount of bending of the light occurs producing wider bands of color as compared to those in the minimum dispersion zone; the minimum and maximum light dispersion zones are created by the slanted surfaces of the light refracting and dispersing elements.

Figure 1:
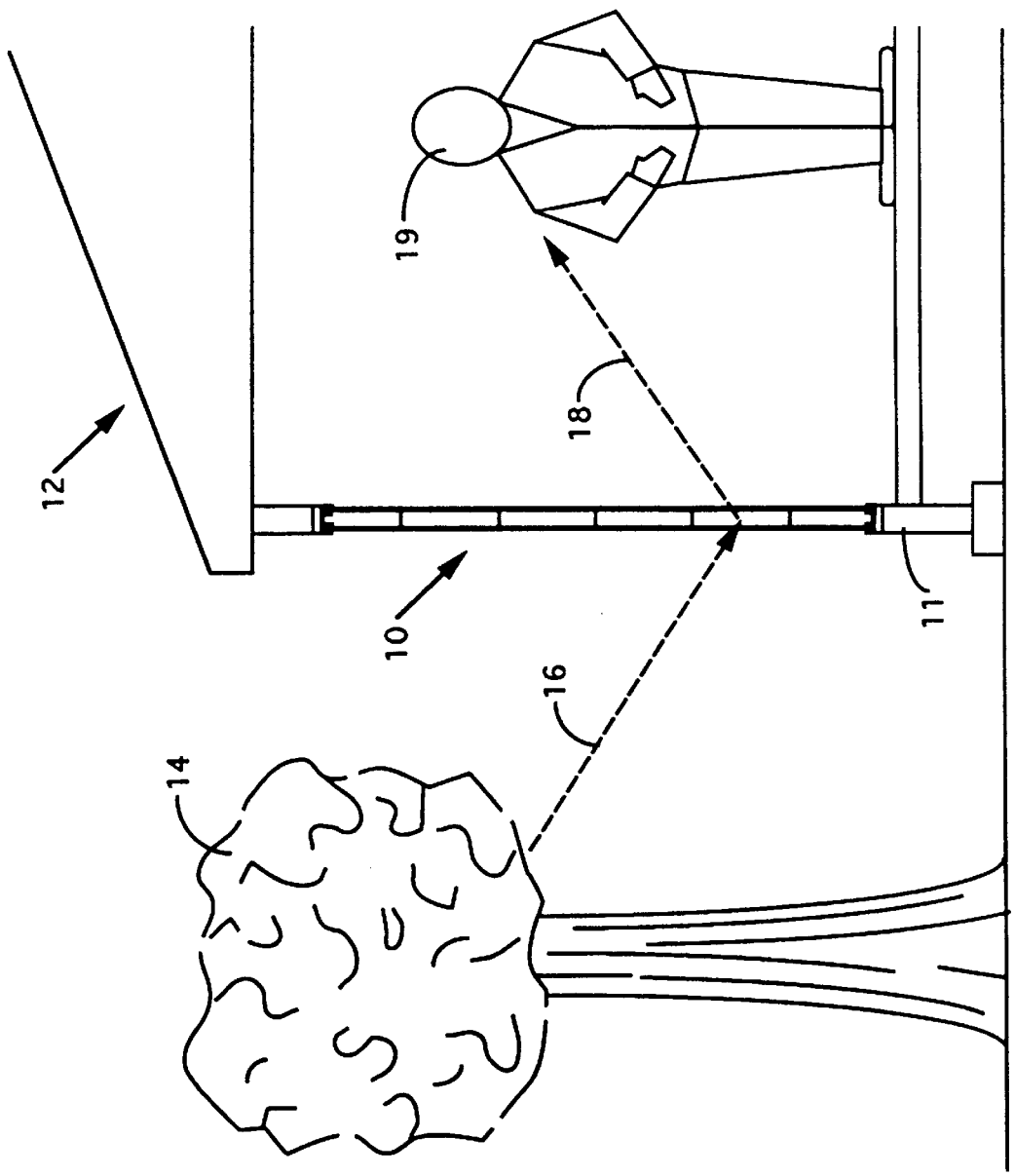
FIG. 1 is a schematic view illustrating the present invention when used in a window system.

FIG. 1 represents the present invention when used in a window system as a windowpane 10 of an exterior wall 11 of building structure 12. The external environment, which consists of trees and other surrounding objects, are represented by a tree at numeral 14. The natural sunlight shines indirectly on the surrounding objects, such as tree 14, and the reflected light waves, represented by the arrow at numeral 16 fall on the transparent elements in one or more panel units in windowpane 10 at an angle, which angle of incidence depends on the location of the sun relative to the external surroundings 14. The refracted light rays, emitted at an angle from the several glass elements of windowpane 10, are represented collectively by an arrow at numeral 18, and reach the eye of an observer 19 inside the building structure 12.

Figure 2:
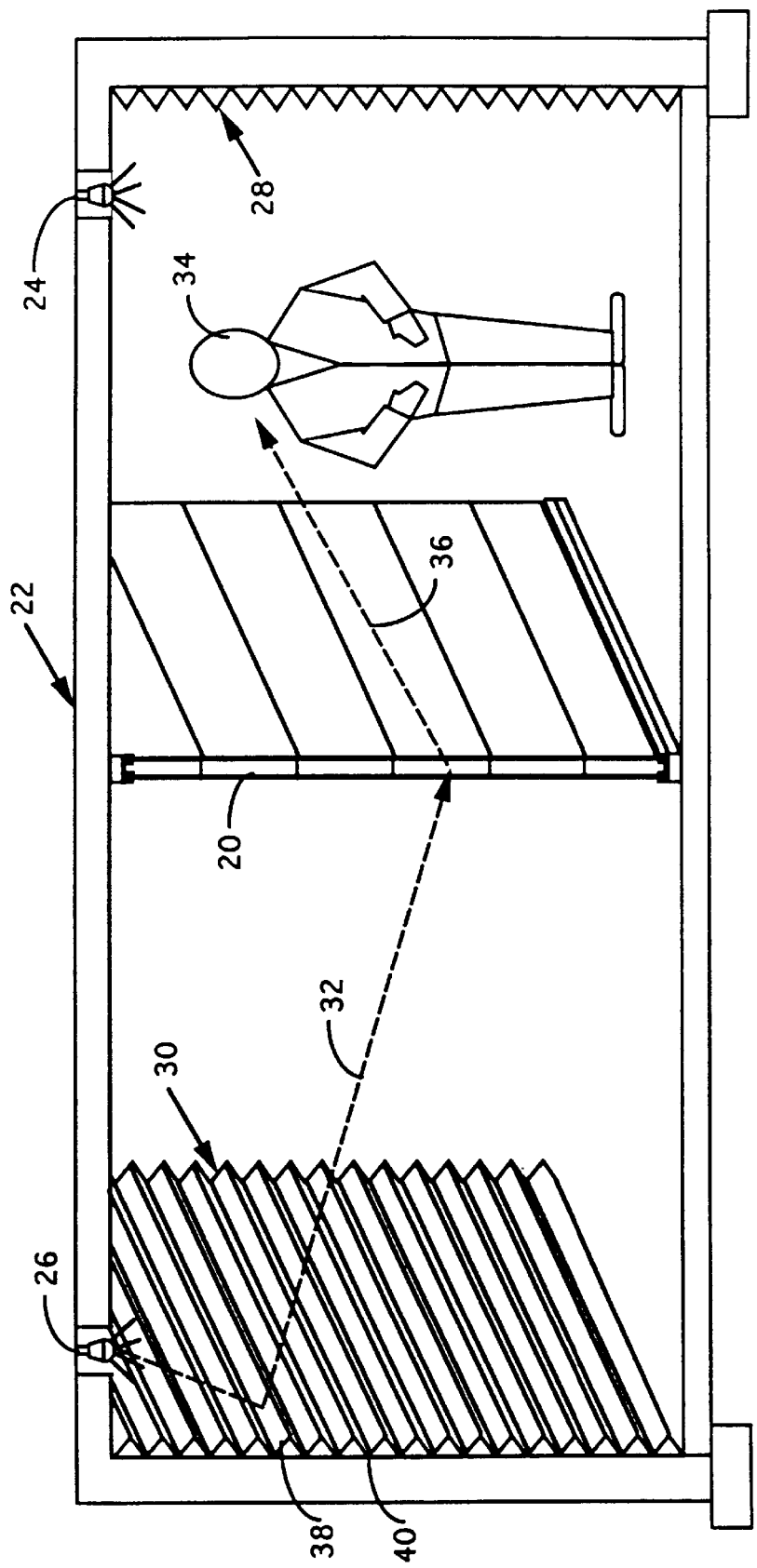
FIG. 2 is a schematic view showing the present invention when used in a partition.

Referring now to FIG. 2, one or more panel units of the present invention may be mounted in an interior glass screen or room partition 20, positioned, for example, in a hall or lobby of a building structure 22 where the natural sunlight of FIG. 1 is not available and therefore is replaced by an artificial light source 24 and 26 on either side of partition 20, and reflecting wall 28 and 30 is spaced away from partition 20. In this embodiment, the light beam from source 26, for example, is reflected from reflecting wall 30 in a manner shown, for example, by the arrow at numeral 32 at an angle onto the surroundings between partition 20 and wall 30, and the reflected light of the surroundings is refracted through partition 20 where the light is dispersed and viewed by observer 34 at an angle shown by the arrow at numeral 36 on the side of partition 20 opposite to that side of partition 20 from whence light source 26 is located. A similar effect occurs when observer 34 is on the opposite side of partition 20 where light source 24 and reflecting wall 28, with one or more panel units of the present invention installed in partition 20, create a colorful mosaic pattern when observer 34 views partition 20.

Figure 3:
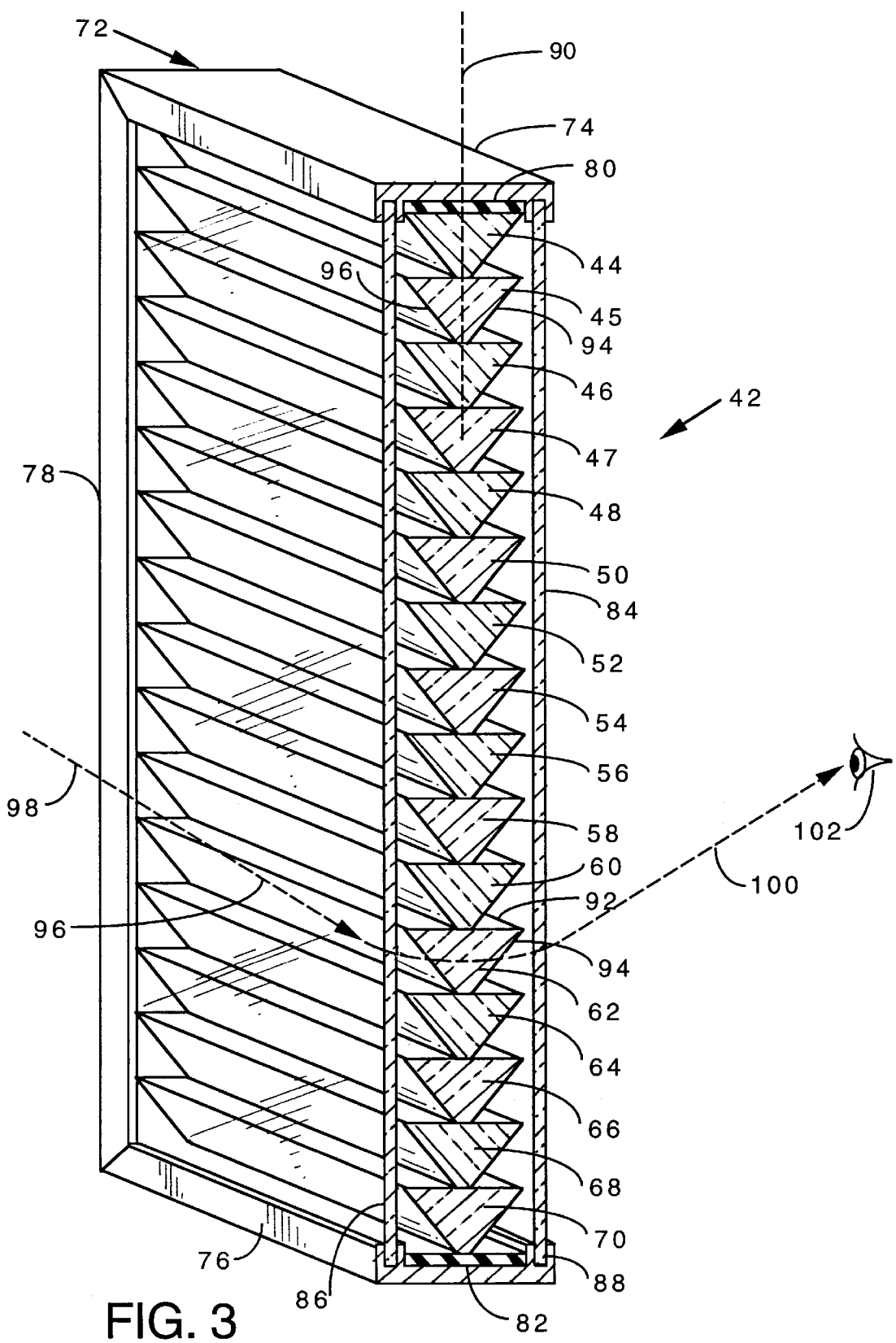
FIG. 3 is a, partially broken away, perspective view of a glass panel unit of the present invention where the transparent elements are uniformly shaped and stacked vertically in layers.
Figure 4:
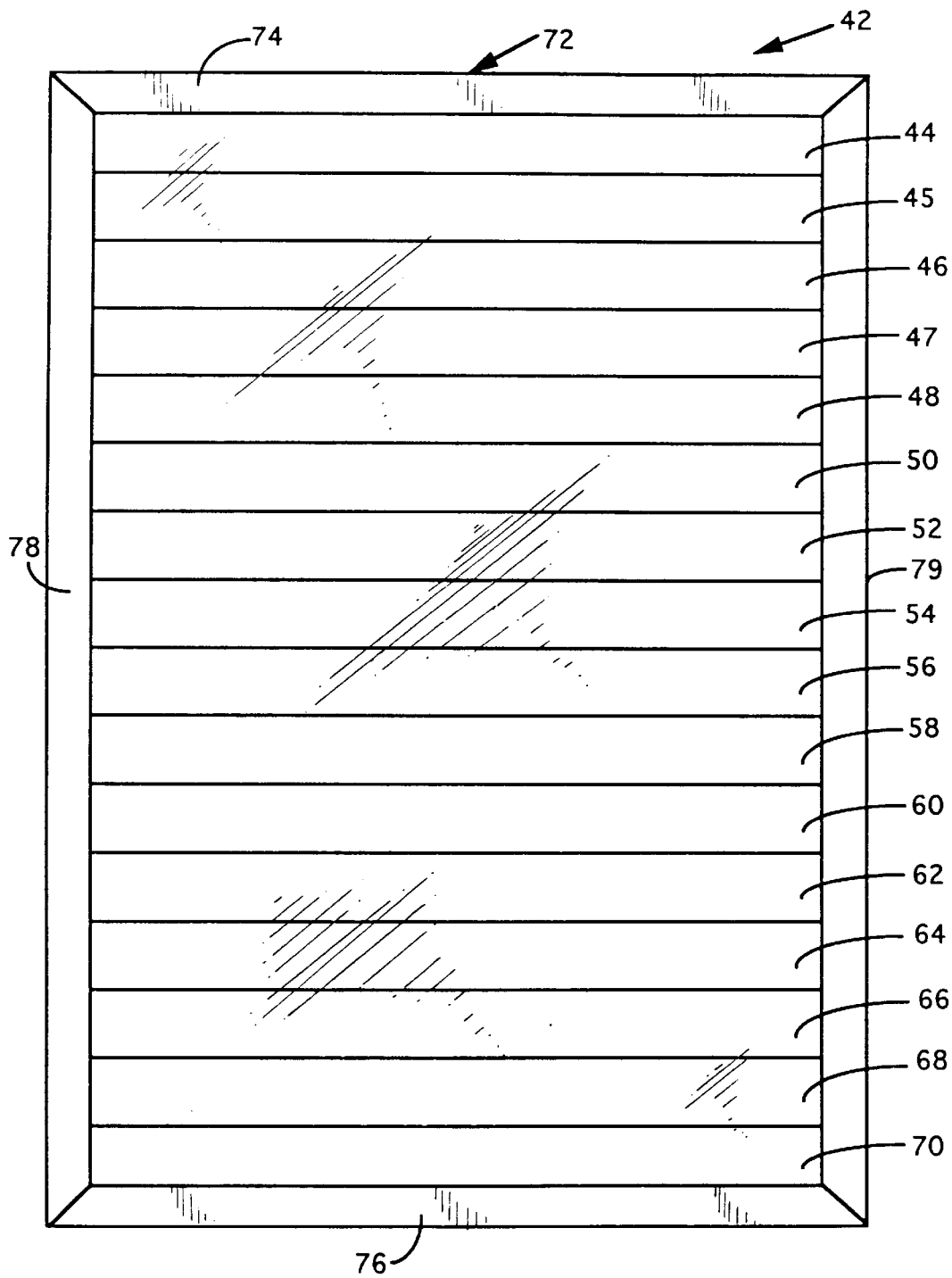
FIG. 4 is a front elevational view showing the panel of FIG. 3.

Preferably, reflecting walls 28 and 30 have several angled or corrugated surfaces, two of which are indicated at numerals 38 and 40 for wall 30. These corrugated surfaces 38 and 40 contain relatively high reflective material, such as metallic, such as tin or aluminum. The walls 28 and 30 may be formed by a relatively flat surface with thin, narrow strips forming corrugated surfaces 38 and 40 where the reflective material adheres only to the surfaces similar to surface 38 facing toward light source 24, or alternately, the reflective material may be attached to both surfaces similar to surfaces 38 and 40, depending on the desired degree of reflection. The walls 28 and 30 and the corrugated surfaces 38 and 40 may be a wood or a foam core structure. Each of the corrugated surfaces 38 and 40 may form an equilateral triangle with about a 60° angle with the flat surface and surfaces 38 and 40 being about 2 inches in length. The panel unit of the present invention which may be installed in windowpane 10 of FIG. 1 or in partition 20 of FIG. 2 is shown in FIGS. 3 and 4 at numeral 42.

Panel unit 42 contains transparent elements 44,45,46,47, 48,50,52,54,62,64, 66,68, and 70, which may be lead crystal glass or optical glass. These elements 44,45,46,47,48,50,52, 54,56,58,60,62,64,66,68 and 70 are generally uniformly and triangularly shaped with equilateral sides with their apex slightly truncated so that elements 44,45,46,47,48,50,52,54, 56,58,60,62,64,66,68 and 70 can abut each other and be stacked vertically in a frame 72. Elements 44,45,46,47,48, 50,52,54,56,58,60,62,64,66,68 and 70 are generally solid, generally uniformly shaped throughout their length, generally the same shape as each other, and generally wider at the top and tapering toward the bottom with reference to FIG. 3.

Elements 44,45,46,47,48,50,52,54,56,58,60,62,64,66,68 and 70 may range from ½ inch to about 12 inches in length. A frame 72 is formed by top channel 74, bottom channel 76, and longitudinal channels, 78 and 79 (show only in FIG. 4). Channel members 74, 76, 78 and 79 may be individual pieces formed and attached to each other similarly to that of a wooden frame for a picture as shown in FIG. 3, or may be attached by other means, such as brackets and bolts attaching two pieces together. Frame 72 may be made of a non-corrosive, non-oxidizing material such as brass, copper, aluminum or steel, and is preferably a structural part of the window or wall system of FIGS. 1 and 2 respectively.

A lining layer as indicated at numerals 80 and 82 exists between top channel 74 and transparent element 44 and between bottom channel 76 and transparent element 70. Even though not shown, a similar lining layer exists between the several transparent elements 44,45,46,47,48,50,52,54, 56,58,60,62,64,66,68 and 70 and the longitudinal side channels 78 and 79, in order to insulate and cushion the transparent elements 44,45,46,47,48,50,52,54,56,58,60,62,64,66, 68 and 70 against the hard surfaces of frame 72.

Preferably, lining layers 80 and 82 are made out of a natural rubber or a synthetic rubber, and are about 1/16 inches thick. A sheet of clear plate glass 84 and 86, which may be tinted to reduce glare, is disposed along both sides of stacked elements 44,45,46,47,48,50,52,54,56,58,60,62,64,66,68 and 70 in order to protect elements 44,45,46,47,48,50,52,54,56, 58,60,62,64,66,68 and 70 from damage and/or breakage. These plate glass sheets 84 and 86 are secured in channels 74,76,78 and 79 by being received in a U-shaped section shown, for example at 88 for glass sheet 84 and element 70.

Still referring to FIG. 3, each element 44,45,46,47,48,50, 52,54,56,58,60,62,64,66,68 and 70 is stacked along a vertical plane indicated at 90, and has a horizontal surface and angled surfaces shown, for example, at numerals 92,94, and 96 respectively for element 62.

The horizontal surface 92 may be frosted so as to reduce the glare from the light source, and the surfaces 94 and 96 as shown for element 45 form angles with the vertical plane 90 of FIG. 3.

The light wave from the reflected light indicated by an arrow at numeral 98 hits against angled surface 96. This resultant light wave is refracted and dispersed in element 62 such that the emerging light ray indicated by an arrow at numeral 100 may reach the eye 102 of the viewer at an angle. The angles in which the light hits surface 96 and emerges from surface 94 are generally fixed by the surfaces 94 and 96 and their 30° slant with the vertical plane indicated at numeral 90 in FIG. 3, and the color pattern is controlled by the objects of the environment on the side of panel unit 72 opposite to that of viewer 102.

Figure 5:
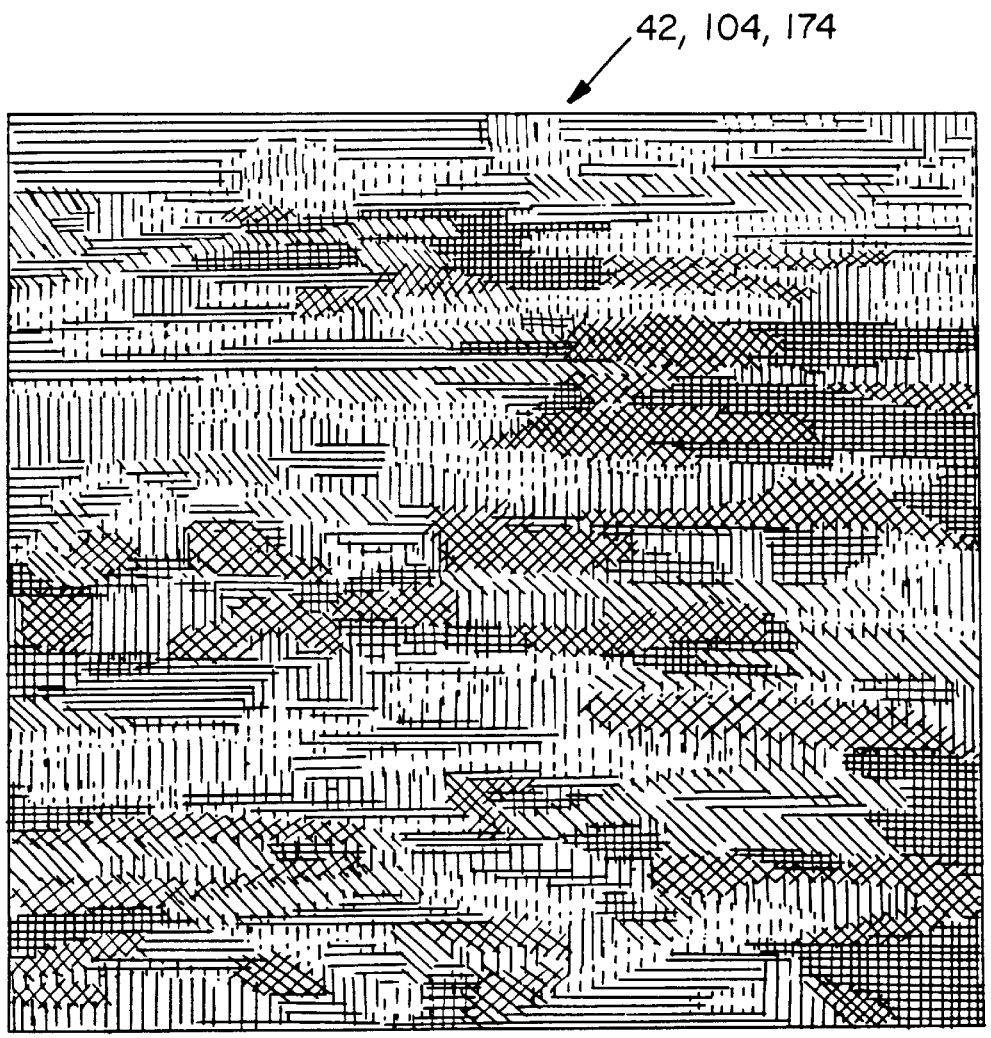
FIG. 5 is a colored coded example of a mosaic color pattern which may be produced by the present invention.

Preferably, the overall dimension for panel unit 42 of FIGS. 3 and 4 is approximately 12 inches high, 1 inch thick, and 12 inches wide. Several of these panel units 42 of FIGS. 3 and 4 may be arranged to form the windowpane 10 of FIG. 1 or the partition 20 of FIG. 2, with the resultant color pattern viewed by the viewer or observer 19,34, or 102 of FIGS. 1–3 being similar to that shown in FIG. 5, which is color coded to represent an example of the produced color pattern.

Generally, panel unit 42 of FIGS. 3 and 4 may be used in a windowpane 10 of FIG. 1 on the north, south, east or west sides of a building. However, glare may develop in the east, west, north or south sides of the building depending on the geographical area, and especially during the winter solstice when the sun is at its lowest point.

Glare in panel unit 42 of FIG. 3 may be reduced by using a solar filter in the form, for example, of a fabric or a one-way mirror. The fabric material (not shown) will preferably be disposed on the surface of plate glass 86 between plate glass 86 and elements 44,45,46,47,48,50,52,54,56,58, 60,62,64,66,68 and 70. If the one-way mirror is used, this one way mirror (not shown) may preferably be substituted for plate glass 86.

Figure 6:
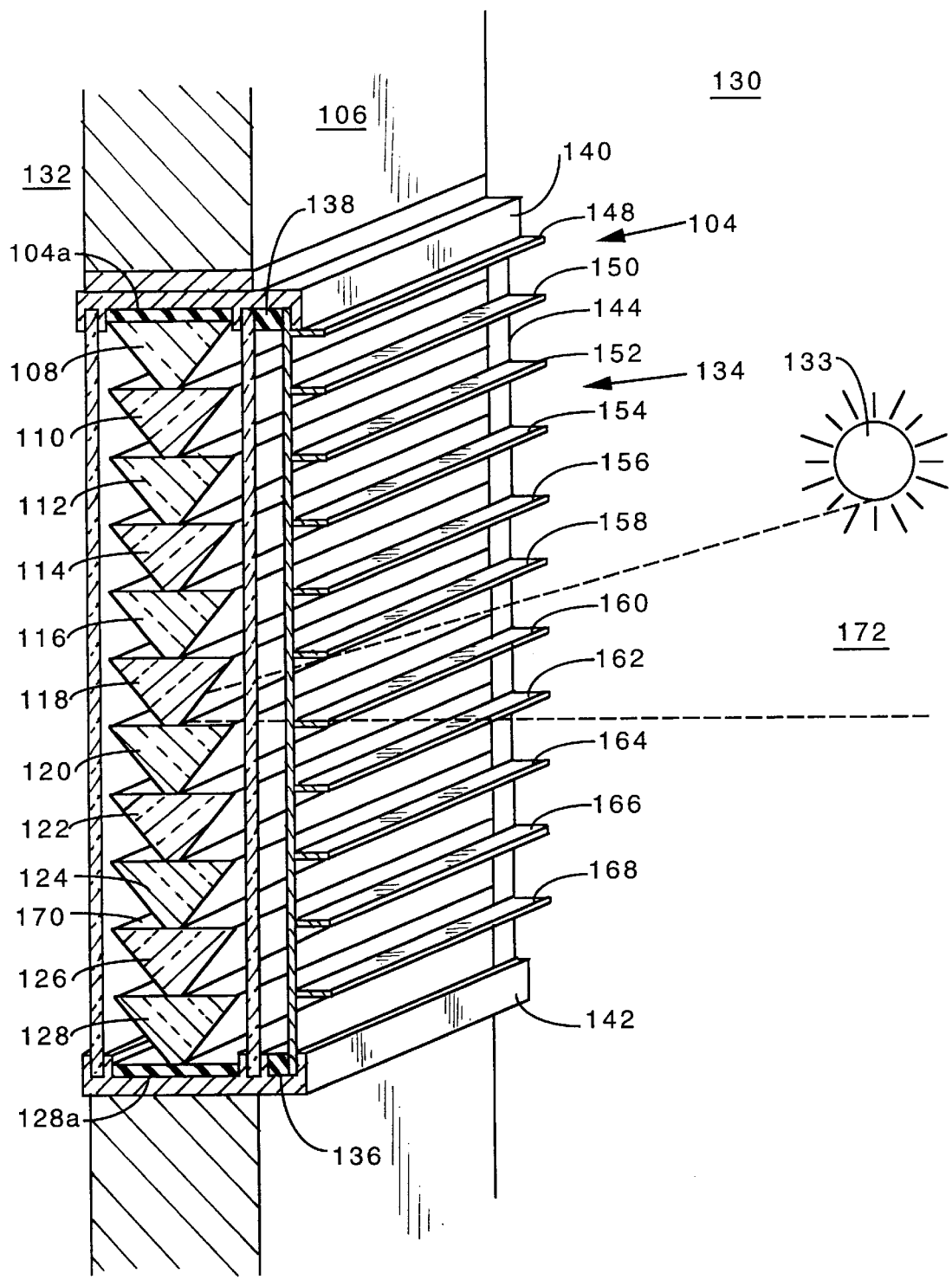
FIG. 6 is a cross-sectional view showing a glass panel unit of the invention in a window system where a shutter apparatus, mounted on the outside of the building structure, may be used to reduce glare from the sun.

The present invention as shown in FIG. 6, preferably, involves a means for reducing glare when using a panel unit similar to that of FIGS. 3 and 4 in a windowpane. This panel unit 104 is in an exterior wall 106 and is similar to panel unit 42. Panel unit 104 contains transparent elements 108,110, 112,114,116,118,120, 122,124,126, and 128, and lining layers 104a and 128a. In this FIG. 6, the outside or external surroundings represented by numeral 130 are located to the right of exterior wall 106 of a building, and the interior represented by numeral 132 is located to the left of exterior wall 106. The means for reducing or resisting glare which may occur due to the direct light by sun 133 depending on the side of the building in which panel unit 104 is installed, which may be the south side thereof, the geographical area, and the angle of the sun in the sky, is in the form of a blind or shutter apparatus 134.

Shutter apparatus 134, preferably, is used on the side of the building, where glare occurs, is spaced away from panel unit 104 by suitable spacers, 136 and 138, and is connected to the outside of exterior wall 106 by a frame comprising connector members 140 and 142 by suitable fastening means, not shown.

Preferably, the frame of shutter apparatus 134 is comprised of horizontal connector members 140 and 142, and vertical connector members one shown at 144, and several horizontally fixed and spaced-apart strip members 148,150, 152,154,156, 158,160,162,164,166 and 168 which are attached to the vertical parallel connector members, one shown at 144. These strip members 148,150,152,154,156, 158,160,162,164,166 and 168 are generally spaced a distance from each other equal to the vertical length of each transparent element 108,110,112,114,116,118,120,122,124, 126 and 128 so that for example the horizontal top surface indicated at 170 for segment 126 of each element 108,110, 112,114,116,118,120,122,124,126 and 128 is in line with or extends parallel to its respective strip member 148,150,152, 154,156,158,160,162,164,166 and 168. The width of strip members 148,150,152,154,156,158,160,162,164,166 and 168 may be about 3/8 inches.

The spacer members 136 and 138 may be about 12 inches long and about 1/8 to 1/4 inches wide. The dimensions for each strip member 148,150,152,154,156,158,160,162,164,166 and 168 may be about 12 inches long, about 3/8 inches wide, and about 1/32 inches thick. The material for strip members 148,150,152,154,156,158,160,162,164,166 and 168 may be plastic or metal, such as brass, copper or steel, and the material for spacer members 136 and 138 may be plastic or rubber.

In FIG. 6, a viewing zone for element 118 is shown by area 172 formed between strip members 158 and 160. This viewing zone 172 is a maximum dispersion zone for element 118 as well as the remaining elements in FIG. 6. No minimum dispersion zone is created for elements 108,110, 112,114,116,118,120,122,124,126 and 128 in view of their triangular shape. A similar viewing zone is formed for each element 108,110,112,114,116,118,120,122,124,126 and 128 between their respective strip members 148,150,152,154, 156,158,160,162,164,166 and 168, and occurs when sun 133 is positioned above viewing zone 172 extending between the dashlines of FIG. 6 for the winter solstice. When the shutter apparatus 134 is installed, for example, on the south side of the building, the sun 133 shown in FIG. 6 is shown in its lowest position for the winter solstice. However, the glare which would normally occur for element 118, is reduced by strip member 158. This principle applies for each element 108,110,112,114,116,118,120,122,124,126 and 128 and their respective strip members 148,150,152,154,156,158,160, 162,164,166 and 168.

The strip members 148,150,152,154,156,158,160,162, 164,166 and 168 are shown as being in a fixed horizontal position, but it is to be understood that these strip members 148,150,152,154,156,158,160,162,164,166 and 168 may be constructed to be pivoted about their mounted axis on vertical members 144 and 146. Also, shutter apparatus 134 is made of a durable, sturdy, and non-oxidizing material in order to withstand the harsh environments of both the summer and winter months.

This shutter apparatus 134 of FIG. 6 is mostly used to reduce glare for a panel unit such as that of panel unit 104 having several similarly shaped transparent elements 108, 110,112,114,116,118,120,122,124,126 and 128.

Figure 7:
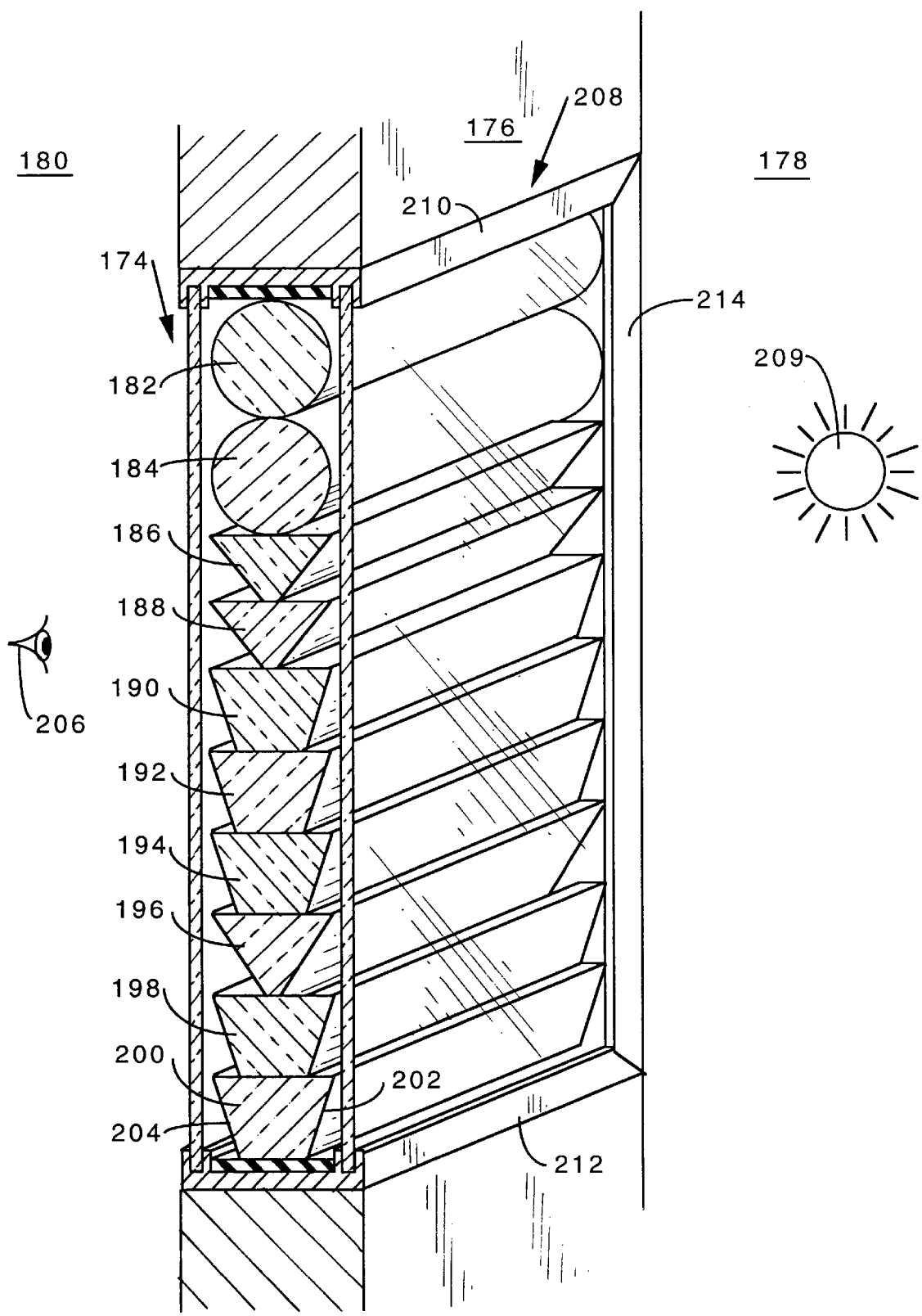
FIG. 7 is a cross-sectional view of a glass panel unit of the present invention in a window system where the transparent elements have different cross-sectional configurations, and are stacked vertically in layers.
Figure 8:
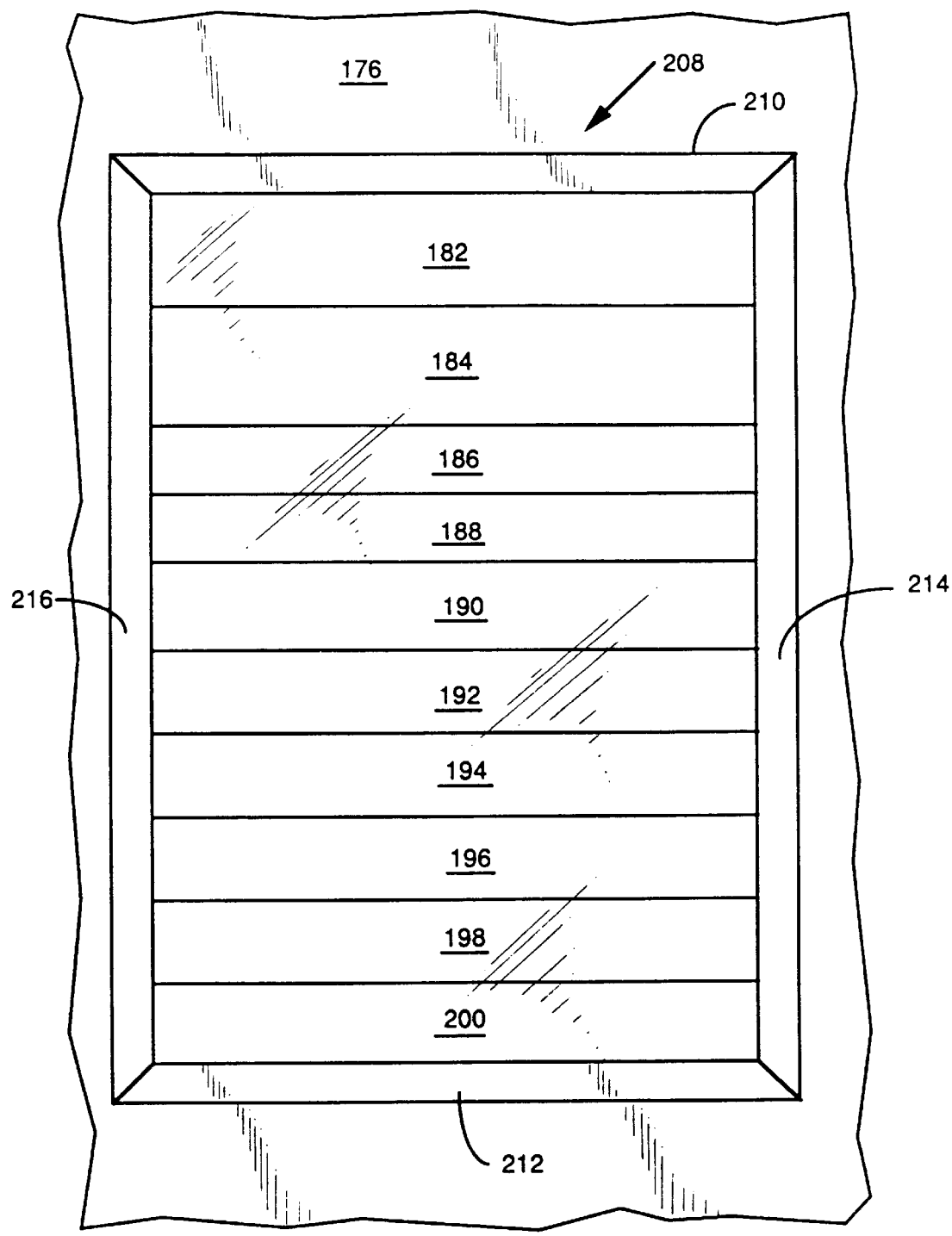
FIG. 8 is a front elevational view showing the panel unit of FIG. 7.

Instead of shutter apparatus 134 being used for reducing or resisting glare, the embodiment in FIGS. 7 and 8 illustrate a panel unit 174. As shown in FIG. 7, panel unit 174 is in an exterior wall 176 where the outside environment is represented by 178 to the right of wall 176 and the inside environment is represented by 180 to the left of wall 176.

Essentially, this panel unit 174 is constructed similarly to panel unit 42 of FIGS. 3 and 4 and to panel unit 104 of FIG. 6, except the shape of transparent elements 182,184,186, 188,190,192,194,196,198, and 200 varies, as best shown in FIG. 7.

Top elements 182 and 184 are generally circular in cross-section, elements 186,188, and 196 are generally triangular in cross-section, and the remaining elements 190, 192,194,198, and 200 are trapezoidal in cross-section. Segments 186, 188, and 196 are similar to those shown in FIG. 3 represented at numerals 44,45,46,47,48,50,52,54,56,58, 60,62,64,66,68 and 70. Each trapezoidal element 190,192, 194,198, and 200 has slanted surfaces similar to that shown for slanted surfaces 202 and 204 of segment 200. These slanted surfaces 202 and 204 are preferably angled to create for the viewer represented at 206 a zone of minimum color dispersion of the external environment.

Panel unit 174 is comprised of a frame 208 formed by top channel 210, bottom channel 212, and longitudinal channels 214 and 216. This frame 208 may be similar to that of 72 for panel unit 42.

The panel unit 104 of FIG. 6 may preferably be installed in a windowpane for an external wall where there may be direct sunlight and a glare zone is created, which may be in the south side of a building. The panel unit 42 of FIG. 3 and the panel unit 174 of FIG. 7 may be used in a window structure in an external wall where there is no direct sunlight and only indirect sunlight which may be in the north, east, or west side of a building or if solar filters are used as discussed herein above, panel unit 104 may be used in the north, south, east, or west side of the building. Also, panel units 42 and 174 of FIGS. 3 and 7 may be used in a partition similar to that of partition 20 of FIG. 2.

Essentially, the color patterns of the panel unit 42, 104 and 174 of the present invention are controlled by the objects behind the panel opposite to that of a viewer. Color hues can be controlled by the index of refraction for the light refracting and dispersion elements in the panel units 42, 104, and 174; the different types of glass, that is, either optical or lead crystal glass; or the angle tangent to the surface of the element.

As discussed with regard to elements 44,45,46,47,48,50, 52,54,56,58,60,62,64,66,68 and 70 of FIG. 3, the slanted surfaces of triangular elements 186, 188, and 196 generally create a maximum dispersion zone where the bands of color are at their maximum width. The trapezoidal elements 190, 192, 194, 198 and 200 generally create minimum dispersion zones where the bands of color are at their minimum width. For both the trapezoidally shaped and the triangularly shaped elements of FIGS. 3 and 7, a glare zone may occur depending on the positioning of the sun and on whether it is directly facing the panel units of FIGS. 3 and 7. In this instance, as discussed hereinabove, solar filters can be used to reduce this glare.

It is to be understood, that the width of the light dispersion zone is controlled by the angle of the slanted surfaces of the elements of panels 42, 104, and 174, for example, the angle of slanted surfaces 94 and 96 of element 45 of FIG. 3 and slanted surfaces 202 and 204 of element 200 of FIG. 7, relative to a vertical plane. These surfaces may be varied to increase or decrease the width of the band of dispersed light or color.

One or more panel units 42, 104, and 174 of FIGS. 3,4,6,7 and 8 may be used in a windowpane 10 of FIG. 1 or in a partition 20 of FIG. 2. Either optical or leaded crystal glass may be used for the light refracting and dispersing elements 44,45,46,47,48,50,52,54,56,58,60,62,64,66,68 and 70 of panel 42, elements 108,110,112,114,116,118,120,122,124, 126 and 128 of panel 104, and elements 182,184,186,188, 190,192,194,196,198 and 200 of panel unit 174. Many different optical glass and lead crystal glass, such as that referred to as F2 obtained from Schott Glass Technologies, Inc., of Duryea, Pa. may be used. The index of refraction preferably for optical glass is about 1.50 and ranging from about 1.45 to about 1.60, and the index of refraction for lead crystal glass is preferably 1.62 and ranging from about 1.55 to about 1.70.

Whereas, particular embodiments of the present invention have been described above for purposes of illustration, it will be evident to those skilled in the art that numerous variations of the details may be made without departing from the invention as defined in the appended claims.

In accordance with the patent statutes, I have explained the principle and operation of my invention, and have illustrated and described what I consider to be the best embodiments thereof.

What is claimed is:

1. A window having at least one panel unit, said panel unit comprising:

a frame, a plurality of transparent light refracting and light dispersing elements disposed in said frame and having an outside portion and an inside portion, and, said plurality of elements having a relatively high index of refraction, each of said elements being shaped to refract and disperse reflected sunlight impinging on said outside portion at an incident angle into a specific wavelength to produce a block of color in each of said elements such that said plurality of elements form a mosaic color pattern when viewed at said inside portion and which said color pattern changes as said angle of incidence of said sunlight on said outside portion changes.

2. The window of claim 1, wherein each of said plurality of transparent light refracting and dispersion elements is made of lead crystal glass.

3. The window of claim 1, wherein each of said plurality of transparent light refracting and dispersion elements is made of optical glass.

4. The window of claim 1, wherein each of said plurality of transparent light refracting and dispersion elements generally is elongated, triangularly shaped in cross section, and vertically stacked relative to each other, and wherein said triangularly shaped elements create a maximum color dispersion zone.

5. The window of claim 1 having a plurality of said panel units.

6. A window having at least one panel unit, said panel unit comprising:

a frame, a plurality of transparent light refracting and light dispersing elements disposed in said frame and having an outside portion and an inside portion, said plurality of elements having a relatively high index of refraction, each of said elements being shaped to refract and disperse sunlight impinging on said outside portion at an incident angle into a specific wavelength to produce a block of color in each of said elements such that said plurality of elements form a mosaic color pattern when viewed at said inside portion which said color pattern changes as said angle of incidence of said sunlight on said outside portion changes, and, shutter means disposed adjacent to said panel unit and consisting of a plurality of strip members positioned relative to said plurality of elements to reduce glare produced by direct sunlight impinging on said outside portion.

7. The window of claim 6, wherein said plurality of strip members include first and second strip members, at least said first and second strip members arranged substantially parallel to one another.

8. The window of claim 6, wherein said plurality of strip members are generally horizontally arranged relative to said plurality of elements.

9. A window having at least one panel unit, said panel unit comprising:

a frame, a plurality of transparent light refracting and light dispersing elements disposed in said frame and having an outside portion and an inside portion, said plurality of elements having a relatively high index of refraction, each of said elements being shaped to refract and disperse sunlight impinging on said outside portion at an incident angle into a specific wavelength to produce a block of color in each of said elements such that said plurality of elements form a mosaic color pattern when viewed at said inside portion which said color pattern changes as said angle of incidence of said sunlight on said outside portion changes, and wherein each of said plurality of transparent light refracting and dispersion elements is elongated, and trapezoidally shaped in cross-section, and wherein said trapezoidally shaped elements create a minimum color dispersion zone.

10. A partition for indoor use, having a first side and a second side and having:

at least one panel unit, said panel unit comprising a frame and a plurality of transparent light refracting and dispersing elements disposed in said frame, light reflective wall means located on said first side of said partition and spaced away from said panel unit and having at least one light reflecting surface, a light source positioned on said first side of said partition relative to said light reflective wall means for directing light rays onto said light reflecting surface of said wall means to create indirect light rays which are reflected onto the surroundings located between said partition and said light reflective wall means on said first side of said partition, and said plurality of elements having a relatively high index of refraction, each of said elements being shaped to refract and disperse said reflected light rays on said surroundings on said first side of said partition into a specific wavelength to produce a block of color in each of said elements such that said plurality of elements form a mosaic color pattern when viewed from said second side of said partition.

11. The partition of claim 10, wherein each of said plurality of transparent light refracting and dispersing elements is made of lead crystal glass.

12. The partition of claim 10, wherein each of said plurality of transparent light refracting and dispersing elements is made of optical glass.

13. The partition of claim 10, wherein each of said plurality of transparent light refracting and dispersing elements generally is elongated, triangularly shaped in cross section, and vertically stacked relative to each other, and wherein said triangularly shaped element create a maximum color dispersion zone.

14. The partition of claim 10, wherein each of said plurality of elements is elongated, and trapezoidally shaped in cross-section, and wherein said trapezoidally shaped elements create a minimum color dispersion zone.

15. A panel unit having a light reflecting side and a viewing side, comprising:

a frame with an opening, and a plurality of transparent light refracting and dispersing elements in said opening of said frame, said plurality of elements each having a relatively high index of refraction and being shaped to disperse reflected light on said light reflecting side into a specific wavelength to provide a block of color in said each of said elements such that said plurality of elements form a mosaic color pattern when viewed on said viewing side of said panel unit.

16. The panel unit of claim 15, wherein each of said plurality of elements is made of lead crystal glass.

17. The panel unit of claim 15, wherein each of said plurality of elements is made of optical glass.

18. The panel unit of claim 15, wherein each of said plurality of transparent light refracting and dispersing elements generally is elongated, triangularly shaped in cross section, and vertically stacked relative to each other.

19. The panel unit of claim 15, wherein said plurality of elements are uniformly shaped relative to each other.

20. A panel unit having a light reflecting side and a viewing side, comprising:

a frame with an opening, and a plurality of transparent light refracting and dispersing elements in said opening of said frame, said plurality of elements each having a relatively high index of refraction and being shaped to disperse light on said light reflecting side into a specific wavelength to provide a block of color in each of said elements such that said plurality of elements form a mosaic color pattern when viewed on said viewing side of said panel unit, wherein said plurality of elements are irregularly shaped in cross-section relative to each other.

* * * * *